United States Patent [19]

Grosch et al.

[11] 4,084,886
[45] Apr. 18, 1978

[54] DAY/NIGHT OUTSIDE MIRROR FOR VEHICLES

[76] Inventors: Steven Wayne Grosch, 4931 Carthage; Michael John Stack, 1730 Santee River, both of Placentia, Calif. 92670

[21] Appl. No.: 678,871

[22] Filed: Apr. 21, 1976

[51] Int. Cl.² .............................................. G02B 17/00
[52] U.S. Cl. .................... 350/281; 74/501 M
[58] Field of Search .............. 350/61, 63, 278–283, 350/280, 281; 97; 74/501, 501 M, 594.4; 301/37R, 37 SA

[56] References Cited

U.S. PATENT DOCUMENTS 3,550,456   12/1970   Pringle .............................. 74/501 M Primary Examiner—John K. Corbin
Assistant Examiner—B. W. delos Reyes
Attorney, Agent, or Firm—Gausewitz, Carr & Rothenberg

[57] ABSTRACT

This invention provides a day/night outdoor mirror for a vehicle in which the mirror is of the remote-operable type manipulated by Bowden cables at least some of which are clamped on the exterior and under compression between the clamp and the support member for the mirror so that a resilient biasing force is imposed on the support member. The device includes a pivotal mounting means for the support member, an additional Bowden cable for rotating the support member in opposition to the resilient biasing force to shift the mirror to a second angular position, and an operating element which incorporates a detent to hold the mirror in the adjusted position.

11 Claims, 8 Drawing Figures

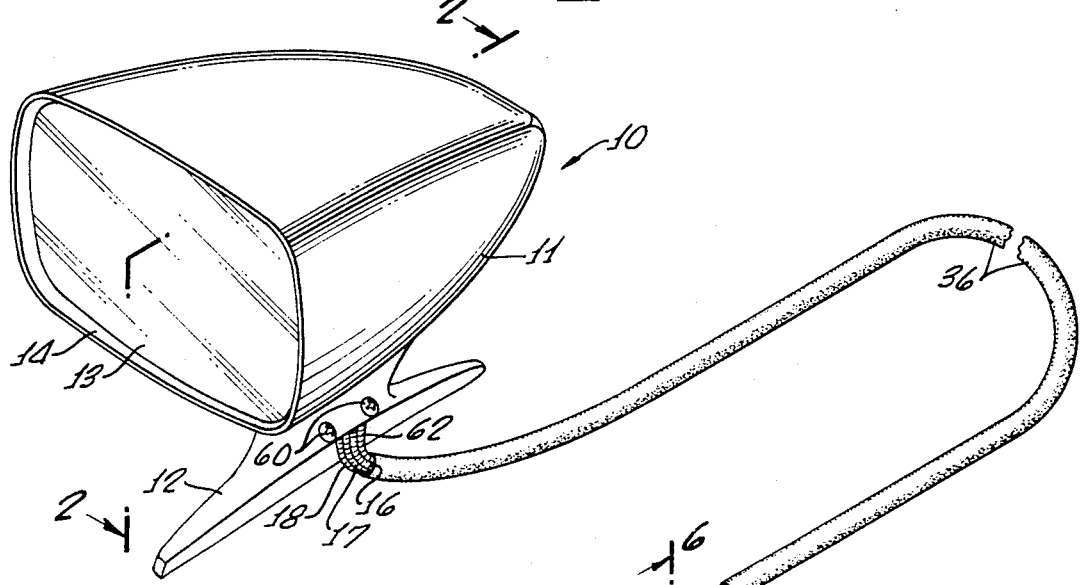
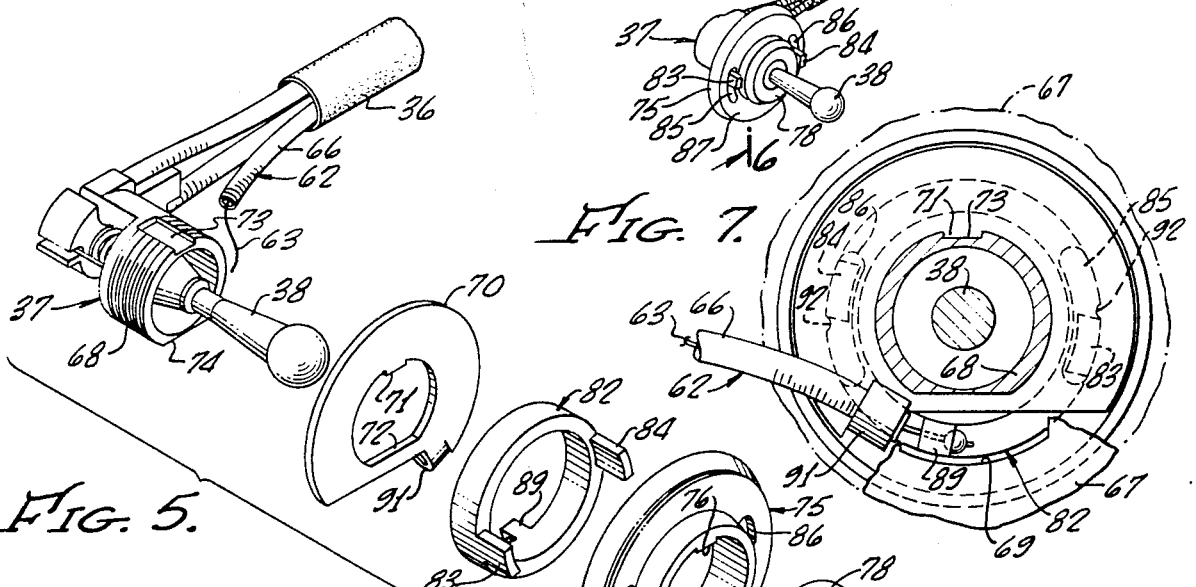
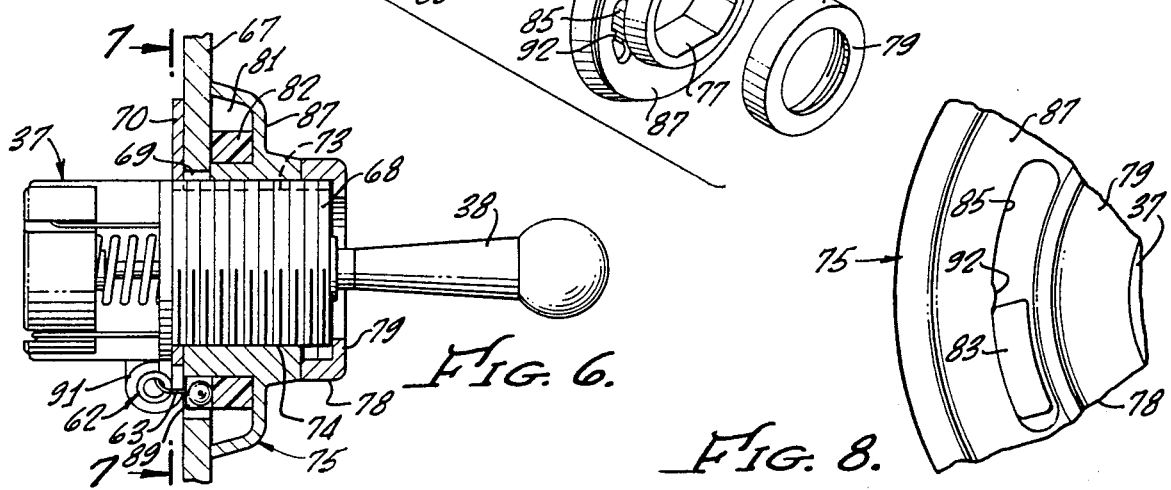

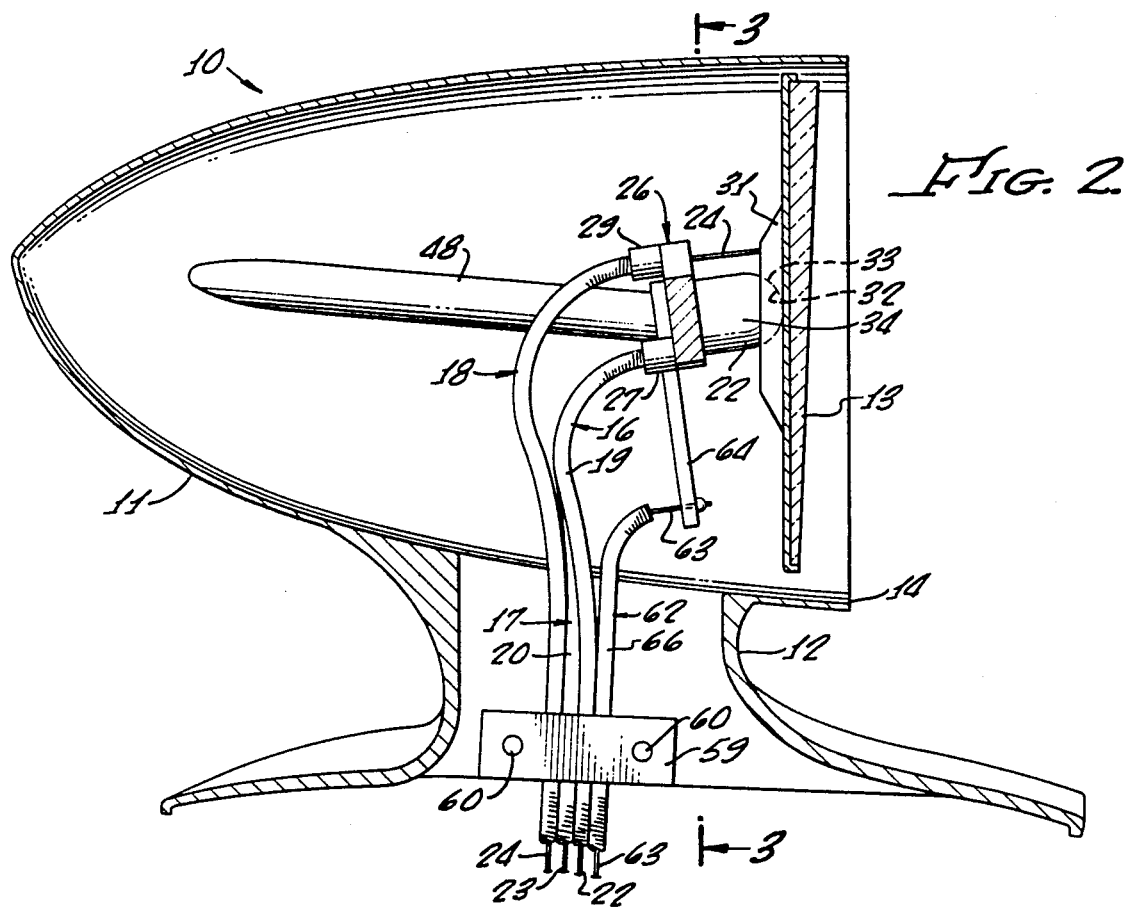
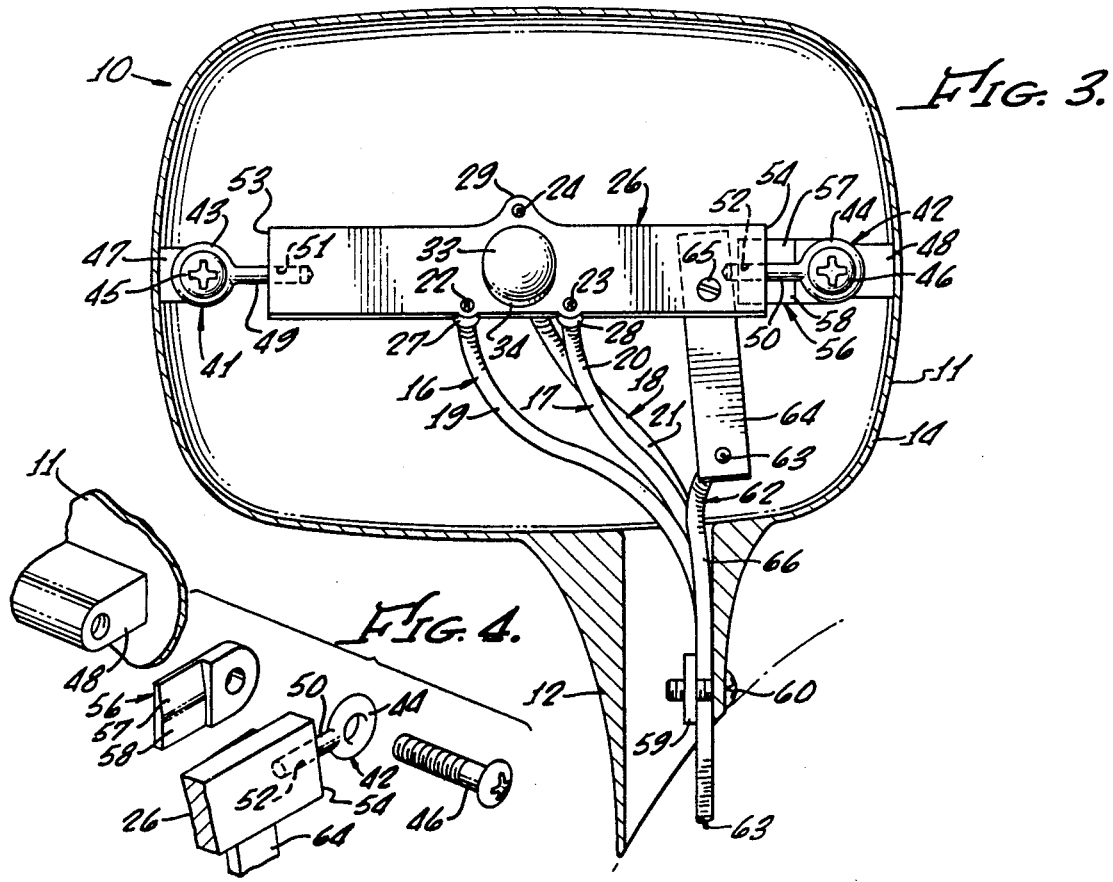

4,084,886

DAY/NIGHT OUTSIDE MIRROR FOR VEHICLES

BACKGROUND OF THE INVENTION

1. Field of the Invention

This invention relates to a remotely adjustable, outside day/night mirror for a vehicle.

2. Description of the Prior Art

Day/night mirrors have become common for the inside rearview mirrors of vehicles offering obvious advantages in eliminating the headlight glare experienced when ordinary mirrors are used. However, the usual outside mirror has not incorporated such an adjustment. Consequently, the motorist still is subjected to glare when driving at night. Some efforts have been made to provide day/night outside mirrors, but generally these have been objectionable because of complexity, expense and, in some cases, lack of convenience of use.

SUMMARY OF THE INVENTION

The present invention provides an improved day/night outside vehicle mirror which is very economically constructed yet effectively shifts the mirror position so as to eliminate glare during night driving. The invention is adapted for use with the conventional type of remotely adjustable outside mirror of the type which is adjusted by three Bowden cables which extend from a control knob on the door panel to the mirror rotatably positioned on a support within a housing. The mirror support is not rigidly held to the housing as in conventional designs, being supported instead for rotational movement. A stop limits the movement in either direction. A resilient force is applied to the support to bias it against the stop, this being provided by two of the Bowden cables which operate the mirror. These Bowden cables extend to the lower portion of the mirror support where their outside coiled wire coverings are connected. These Bowden cables are clamped to the body of the mirror assembly and they are subject to compression between the clamp and the mirror support. As a result, the outer portions of the Bowden cables tend to straighten out and apply resilient forces to the support, biasing it against the stop.

Rotation of the mirror to the nighttime position is accomplished by rotating the support member. This is in opposition to the resilient force of the two Bowden cables. The rotation is accomplished by an additional Bowden cable that extends with the others to the control at the door panel. The additional Bowden cable terminates at a rotatable member associated with the escutcheon plate of the mirror control. Lugs on the rotatable member allow it to be rotated easily to a second position defined by the ends of slots which receive the lugs of the rotatable member. A detent retains the rotatable member in its adjusted position, thereby holding the mirror in a nighttime position. Release is accomplished by overcoming the detent, whereupon the resilient force returns the mirror to the normal daytime position.

BRIEF DESCRIPTION OF THE DRAWINGS

FIG. 1 is a perspective view of the mirror assembly of this invention;

FIG. 2 is an enlarged sectional view, taken along line 2—2 of FIG. 1;

FIG. 3 is a transverse sectional view, taken along line 3—3 of FIG. 2;

FIG. 4 is an exploded fragmentary perspective view showing the stop and one journal for the support member;

FIG. 5 is an exploded perspective view of the control arrangement for the mirror;

FIG. 6 is an enlarged sectional view, taken along line 6—6 of FIG. 1;

FIG. 7 is an enlarged transverse sectional view, taken along line 7—7 of FIG. 6; and FIG. 8 is an enlarged fragmentary elevational view of the escutcheon plate showing the detent for the mirror adjusting member.

DESCRIPTION OF THE PREFERRED EMBODIMENT

The arrangement of this invention is associated with an outside mirror assembly 10 for an automobile, which mirror may include several components of conventional nature. This includes a streamlined housing 11, carried by a base bracket 12, which is adapted to be connected to the exterior of the vehicle, such as on the upper portion of a door. The mirror 13 of the assembly 10 is positioned at the open end 14 of the housing 11, and is of the prismoidal type, which has different reflectivity characteristics at different angles so as to avoid glare at night. In addition, the mirror 13 is remotely adjustable to vary its position to suit the driver of the vehicle. For this purpose there are three Bowden cables 16, 17 and 18 made up of tubular coiled wire exterior sheaths 19, 20 and 21 within which are axially movable thin cables or wires 22, 23 and 24. These Bowden cables extend to a support plate 26 located transversely of the housing 11, inwardly of its open end 14 and behind the mirror 13. The sheaths 19, 20 and 21 of the cables 16, 17 and 18 are received in sockets 27, 28 and 29 on the rearward side of the plate 26 where they are held by staking. The inner cables 22, 23 and 24 extend through openings in the support plate 26 and are anchored to a rearward metal plate 31 on the mirror 13. Included in the plate 31 is a socket 32 which complementarily receives the semispherical end 33 of a support post 34 on the forward side of the central portion of the support plate 26. The wires 22, 23 and 24 of the Bowden cables connect to the plate 31 of the mirror at locations rotationally spaced around the socket 32. Accordingly, by pulling selectively on the cables 22, 23 and 24 the mirror 13 can be rotated about the end 33 of the post 34 in varying the angle of the mirror.

The three Bowden cables 16, 17 and 18 fit within a flexible outer tube 36, extending to a member 37 where the inner cables 22, 23 and 24 are connected to an adjusting lever 38. Manipulation of the lever 38 relative to the member 37 will cause the cables 22, 23 and 24 to be pulled upon as needed in moving these cables to rotate the mirror 13.

The support plate 26 is capable of limited rotational movement about its longitudinal axis in adjusting the mirror between its daytime and nighttime positions. This is provided for by support members 41 and 42 which have apertured end portions 43 and 44 that receive the shanks of screws 45 and 46. This holds the support members 41 and 42 to the ends of flanges 47 and 48 which are integral with the wall of the housing 11. Journals 49 and 50 project from the apertured portions 43 and 44 of the support members 41 and 42, being received in openings 51 and 52 in the ends 53 and 54 of the support plate 26. Accordingly, the support plate 26 can be rotated relative to the housing 11 about the pivot axis defined by the journals 49 and 50.

A stop is provided to limit the rotation of the plate 26 about the journals 49 and 50. This is accomplished by a member 56 which is held to the flange surface 48 by the screw 46 beneath the end portion 44 of the support member 42. The member 56 has an upper surface 57 facing toward the mirror and above the axis of the journals 49 and 50, positioned at an angle to the surface 58 of the member 56 below the journal axis. Consequently, the support plate 26 can rotate upwardly, or in counterclockwise direction as shown in FIG. 2, only until it engages the upper stop surface 57. Rotation in the opposite direction is limited by the lower stop surface 58.

The support plate 26 is biased to a normal position in which it bears against the stop surface 57. This is a resilient biasing force accomplished by the outer sheaths 19 and 20 of the Bowden cables 16 and 17 that attach to the lower portion of the plate 26 beneath the rotational axis of the support plate 26. The Bowden cables 16 and 17, as well as the cable 18, are held beneath a clamp 59 which is fastened by bolts 60 to the post 12 that supports the housing 11 of the mirror assembly. The cables 16 and 17 are pressed outwardly toward the plate 26 prior to the tightening of the clamp 59. This gives their sheaths 19 and 20 substantial curvature. The resulting tendency of the cable sheaths 19 and 20 to straighten out causes them to exert a resilient force on the lower portion of the plate 26, biasing it counterclockwise as shown in FIG. 2. Some opposite force may be exerted by the upper cable sheath 21 which is on the side of the pivot axis of the plate 26 opposite from the lower cable sheaths 19 and 20, but the force of the two lower cables easily overcomes the force of the single upper cable to assure the proper bias. Thus, the plate 26 that mounts the mirror is subject to a rotational biasing force without the use of a separate spring, using only the Bowden cables normally present in a remotely adjustable outside mirror.

Rotation of the support plate 26 in opposition to the biasing force of the cables 16 and 17 is accomplished by a fourth Bowden cable 62 which also is held by the clamp 59. The outer end of the inner wire or cable 63 of the Bowden cable 62 extends to an arm 64 that is secured by a screw 65 to the plate 26 and depends from the plate. Pulling on the wire 63 will exert a rotational force for pivoting the plate 26 about the journals 49 and 50 in opposition to the resilient force on the plate 26 exerted by the Bowden cables 16 and 17.

It is possible to obtain a resilient biasing force on the support plate 26 from the fourth Bowden cable 62 in lieu of or in addition to the biasing force of the cables 16 and 17. If this is to be done, the sheath 66 of the cable 62 is connected to the arm 64 and is moved outwardly prior to clamping so as to be given substantial curvature.

The Bowden cable 62, as well as the cables 16, 17 and 18, terminates at the member 37 which is adapted for mounting on the door panel 67 of the vehicle upon which the mirror 10 is installed. The cables are inside the door behind the panel 67 so that they are hidden from sight. The member 37 includes a threaded end portion 68 which extends through an opening 69 on the door panel 67. A washer 70 fits on the threaded portion 68 inside the door, being held against rotation by an inwardly extending tab 71 and a flat chordal surface 72. These engage a slot 73 and a flat surface 74 on the periphery of the threaded portion 68. On the side of the door panel 67 opposite from the washer 70 is an annular escutcheon plate 75 that slides over the periphery of the threaded end 68. The escutcheon plate 75 has an inwardly extending key 76 and a flat surface 77 which engage the surface of the slot 73 and the flat portion 74 of the member 37, preventing rotation of the escutcheon plate. The assembly is held together by a nut 78 that threads on the outer end of the escutcheon plate and includes a flange 79 that engages the outer end of the threaded portion 68 of the member 37.

Adjacent the panel 67 the escutcheon plate 75 includes an annular recess 81. Within this recess is a ring 82 which has a pair of diametrically opposed lugs 83 and 84 which extend outwardly through arcuate slots 85 and 86 in the radial wall 87 of the escutcheon plate. The lugs 83 and 84, therefore, provide a means for rotating the ring 82 through a limited arc.

An additional lug 89 extends outwardly in the opposite side of the ring 82 and receives the end of the wire 63 of the Bowden cable 62. The sheath 66 of the cable 62 is held by a bent over tab 91 integral with the washer 70.

By this construction, therefore, it is possible to rotate the ring 82 through a limited arc, thereby pulling on the wire 63 of the Bowden cable 62. This will rotate the plate 26 in opposition to the spring force exerted by the cables 16 and 17, causing it to engage the lower stop surface 58. A detent retains the ring 82 in its rotated position which may be an inward bulge 92 in the wall of the slot 85, as shown in FIG. 8, which fits behind the lug 83 when the lug 83 is adjacent the end of the slot 85. Consequently, the plate 26, and hence the mirror 13, can be rotated through a limited predetermined arc by manipulation of the ring 82 to be held in this position by the detent 92. Reverse rotation of the ring 82 returns the mirror 13 to its original position where it is held by virtue of the spring force of the cables 16 and 17 that position the plate 26 against the stop surface 57. With the mirror 13 being of the prismoidal type, when rotated by the ring 82 it is tilted downwardly to its nonglare position suitable for night driving.

The driver of the vehicle obtains the advantages of a day/night mirror although the mirror is positioned exteriorly of the vehicle and is remotely adjustable. The original setting of the mirror is never disturbed by moving it to the nighttime position, because only the support plate 26 is rotated which bodily moves the entire mirror assembly of the mounting plate and the mirror 13 without altering the positions of the wires 22, 23 and 24 of the cables 16, 17 and 18. The device is simple to operate, unobstrusive in appearance and very economically constructed, not even requiring an auxiliary spring element for imparting a rotational bias to the mirror.

The foregoing detailed description is to be clearly understood as given by way of illustration and example only, the spirit and scope of this invention being limited solely by the appended claims.

We claim:

1. A day/night mirror assembly for the exterior of a vehicle comprising a prismoidal mirror, a body adapted for attachment to the exterior of a vehicle, a support rotatably supporting said mirror, means rotatably connecting said support to said body, and means for adjusting the position of said mirror relative to said body, said adjusting means including,
at least one outer cable element engaging said support and resiliently biasing the same in one direction,
and means for moving said support in the opposite direction in opposition to said resilient biasing.

2. A device as recited in claim 1 in which said means for moving said support in the opposite direction includes an inner cable element engaging said support for so moving said support in response to tension on said inner cable element.

3. A device as recited in claim 2 in which said adjusting means includes
a first Bowden cable means having said outer cable element,
and a second Bowden cable means having said inner cable element.

4. A device as recited in claim 3 in which said first Bowden cable means includes inner cable element means engaging said mirror for adjusting the rotational position of said mirror relative to said support.

5. A device as recited in claim 2, including in addition detent means for holding said inner cable element in a position where the same has so moved said support member in the opposite direction in opposition to said resilient biasing.

6. A device as recited in claim 2 in which said adjusting means includes means for moving said inner cable element,
said means for moving said inner cable element being adapted for positioning at a location remote from said body, and including
a rotatable member,
and means for mounting said rotatable member.

7. A device as recited in claim 6 in which
said rotatable member comprises a ring having at least one lug projecting outwardly therefrom,
and said means for rotatably mounting said rotatable member comprises an escutcheon plate having an annular recess receiving said ring, and aperture means receiving said lug, whereby said ring can be rotated from the exterior of said escutcheon plate.

8. A device as recited in claim 1 in which said adjusting means includes means for securing said outer cable element to said body at a location remote from said support, said outer cable element being bent between said securing means and said support so that said outer cable element can exert said resilient biasing force.

9. A device as recited in claim 8 including stop means for limiting the rotation of said support about said axis in either direction.

10. A device as recited in claim 9 in which said means rotatably connecting said support to said body includes a duality of opposed journals engaging said support at opposite ends thereof.

11. A device as recited in claim 1 in which said means rotatably connecting said support to said body defines a pivot axis for said support, and said adjusting means includes three Bowden cables two of which have outer cable elements engaging said support on one side of said pivot axis for so resiliently biasing said support.

* * * * *